United States Patent
Yang et al.

(10) Patent No.: US 8,400,234 B2
(45) Date of Patent: Mar. 19, 2013

(54) APPARATUS FOR REMOVING LEAKAGE SIGNAL

(75) Inventors: Young-goo Yang, Hwaseong (KR); Min-su Kim, Bucheon (KR); Sung-chan Jung, Suwon (KR)

(73) Assignees: Samsung Techwin Co., Ltd., Changwon (KR); Sungkyunkwan University Foundation for Corporate Collaboration, Suwon-si (KR)

( * ) Notice: Subject to any disclaimer, the term of this patent is extended or adjusted under 35 U.S.C. 154(b) by 378 days.

(21) Appl. No.: 12/827,074

(22) Filed: Jun. 30, 2010

(65) Prior Publication Data

US 2010/0327990 A1    Dec. 30, 2010

(30) Foreign Application Priority Data

Jun. 30, 2009    (KR) .................. 10-2009-0059294

(51) Int. Cl.
*H01P 5/12*    (2006.01)
*H04B 1/10*    (2006.01)

(52) U.S. Cl. ...................... 333/109; 455/283

(58) Field of Classification Search .................. 333/109, 333/110, 24.1, 24.2; 455/63.1, 67.11, 67.13, 455/73, 283
See application file for complete search history.

(56) References Cited

U.S. PATENT DOCUMENTS

| | | | | |
|---|---|---|---|---|
| 8,175,535 B2* | 5/2012 | Mu | | 455/67.11 |
| 8,249,536 B2* | 8/2012 | Jung et al. | | 455/283 |
| 2011/0300817 A1* | 12/2011 | Jung et al. | | 455/114.2 |

FOREIGN PATENT DOCUMENTS

| KR | 10-2006-0022082 A | 3/2006 |
|---|---|---|
| KR | 10-2009-0047871 A | 5/2009 |

* cited by examiner

*Primary Examiner* — Dean O Takaoka
(74) *Attorney, Agent, or Firm* — Sughrue Mion, PLLC (57) ABSTRACT

An apparatus for removing a leakage signal includes a coupler including a transmission port through which a transmission signal is input, an antenna port through which the transmission signal is output to an antenna and a receiving signal is input from the antenna, and a receiving port through which the receiving signal is output; and a removing unit which outputs, to the receiving port, a leakage removing signal having a same magnitude as one of or a sum of a magnitude of a first leakage signal of the transmission signal, which is generated at the transmission port and input to the receiving port, and a magnitude of a second leakage signal of the transmission signal which is input to the receiving port through the antenna port, the leakage removing signal having an opposite phase to one of the phases or an aggregate phase of the first and second leakage signals.

15 Claims, 7 Drawing Sheets

APPARATUS FOR REMOVING LEAKAGE SIGNAL

CROSS-REFERENCE TO RELATED PATENT APPLICATION

This application claims priority from Korean Patent Application No. 10-2009-0059294, filed on Jun. 30, 2009, the disclosure of which is incorporated herein in its entirety by reference.

BACKGROUND

1. Field

Apparatuses consistent with the present invention relate to removing a leakage signal from a radio frequency identification (RFID) reader.

2. Description of the Related Art

Among systems using same transmission and receiving frequencies, radio frequency identification (RFID) systems are the most widely used. RFID systems are deployed with a wireless recognition system technology in which an electronic chip is attached to a desired object to be recognized through a wireless frequency, the object to be recognized is identified, and information stored in the electronic chip is obtained. Also, the RFID systems are a base for a next-generation ubiquitous sensor network (USN) for unifying information about an object to be recognized, by using the electronic chip in a network. An RFID system generally includes an electronic chip attached to an object to be recognized and containing information about the object, and a reader for collecting the information.

Most widely-used wireless communication systems use different bandwidths for receiving and transmission frequencies. However, in the case of a system using the same transmission and receiving frequencies like an RFID system, a transmission signal should be transmitted continuously from a reader side even in the instant that the reader is receiving a receiving signal so that an electronic chip can generate the receiving signal using power of the transmission signal.

The reader includes a digital processor (not shown) for processing the information about the object to be recognized, and a transmission and receiving unit (not shown) for signal transmission and receiving. In a general communication system, one antenna is used, and different frequencies are used when transmitting and receiving signals. Thus, for separation between signal transmission and signal receiving, an element that operates on different paths according to frequencies, such as a duplexer is used, thereby separating transmission and receiving signals from each other.

However, in a transmission and receiving system using a same frequency like in an RFID system, transmission and receiving signals are separated from each other by using an element for transmitting a signal only in one direction according to an input port. As an example thereof, a circulator or a directional coupler that is an element for separating transmission and receiving signals is used.

A feature of an RFID system is that a transmission signal should be transmitted while a receiving signal is being received. This kind of a transmission and receiving system is constituted using a circulator or a directional coupler having a good separation capability between ports so as to separate transmission and receiving signals from each other. However, since the circulator or the directional coupler does not have a characteristic of an idealistic element, an impedance mismatching phenomenon occurs between an output unit of the circulator or directional coupler and an antenna. Thus, the transmission signal is reflected. The reflected transmission signal is input to a receiving unit and is called a reflected transmission leakage signal. The reflected transmission leakage signal is input to the receiving unit and causes degradation of performance of the receiving unit. Also, since the reflected transmission leakage signal has a larger magnitude than that of the receiving signal including information received by an electronic chip, a capability for recognizing the electronic chip of the entire system may also be reduced.

SUMMARY

One or more of exemplary embodiments provides an apparatus for removing a leakage signal from all frequency bands of a radio frequency identification (RFID) system.

One or more of the exemplary embodiments also provides an apparatus for removing a leakage signal by which a recognition rate of a tag can be increased in a real-time adaption manner so as to remove the leakage signal even when an RFID system environment is changed.

According to an exemplary embodiment, there is provided an apparatus for removing a leakage signal, the apparatus including: a coupler including a transmission port through which a transmission signal is input, an antenna port through which the transmission signal is output to an antenna and a receiving signal is input from the antenna, and a receiving port through which the receiving signal is output; and a removing unit which is connected to the receiving port and outputs, to the receiving port, a leakage removing signal having a same magnitude as one of or a sum of a magnitude of a first leakage signal of the transmission signal, which is generated at the transmission port and input to the receiving port, and a magnitude of a second leakage signal of the transmission signal which is input to the receiving port through the antenna port, the leakage removing signal having an opposite phase to one of the phases or an aggregate phase of the first and second leakage signals.

According to an exemplary embodiment, the removing unit may be further connected to at least one of the transmission port and the antennal port.

According to an exemplary embodiment, the apparatus for removing a leakage signal may further include an offset unit which changes the phase of the second leakage signal.

According to an exemplary embodiment, the first leakage signal may include a signal generated at the transmission port when the transmission signal is transmitted from the transmission port to the antenna port through the coupler, and the second leakage signal may include a reflection signal which, as a portion of the transmission signal input from the transmission port to the antenna port through the coupler, is reflected from the antenna.

According to an exemplary embodiment, the apparatus for removing a leakage signal may further include a leakage signal detector which detects at least a portion of the first leakage signal and the second leakage signal, and a controller which outputs a control signal corresponding to the detected at least the portion of the first and second leakage signals, wherein the removing unit receives the control signal to output the leakage removing signal.

BRIEF DESCRIPTION OF THE DRAWINGS

The above and other aspects of the present inventive concept will become more apparent by describing in detail exemplary embodiments thereof with reference to the attached drawings, in which.

DETAILED DESCRIPTION OF EXEMPLARY EMBODIMENTS

Hereinafter, the present inventive concept will be described in detail by explaining exemplary embodiments with reference to the attached drawings.

Figure 1:
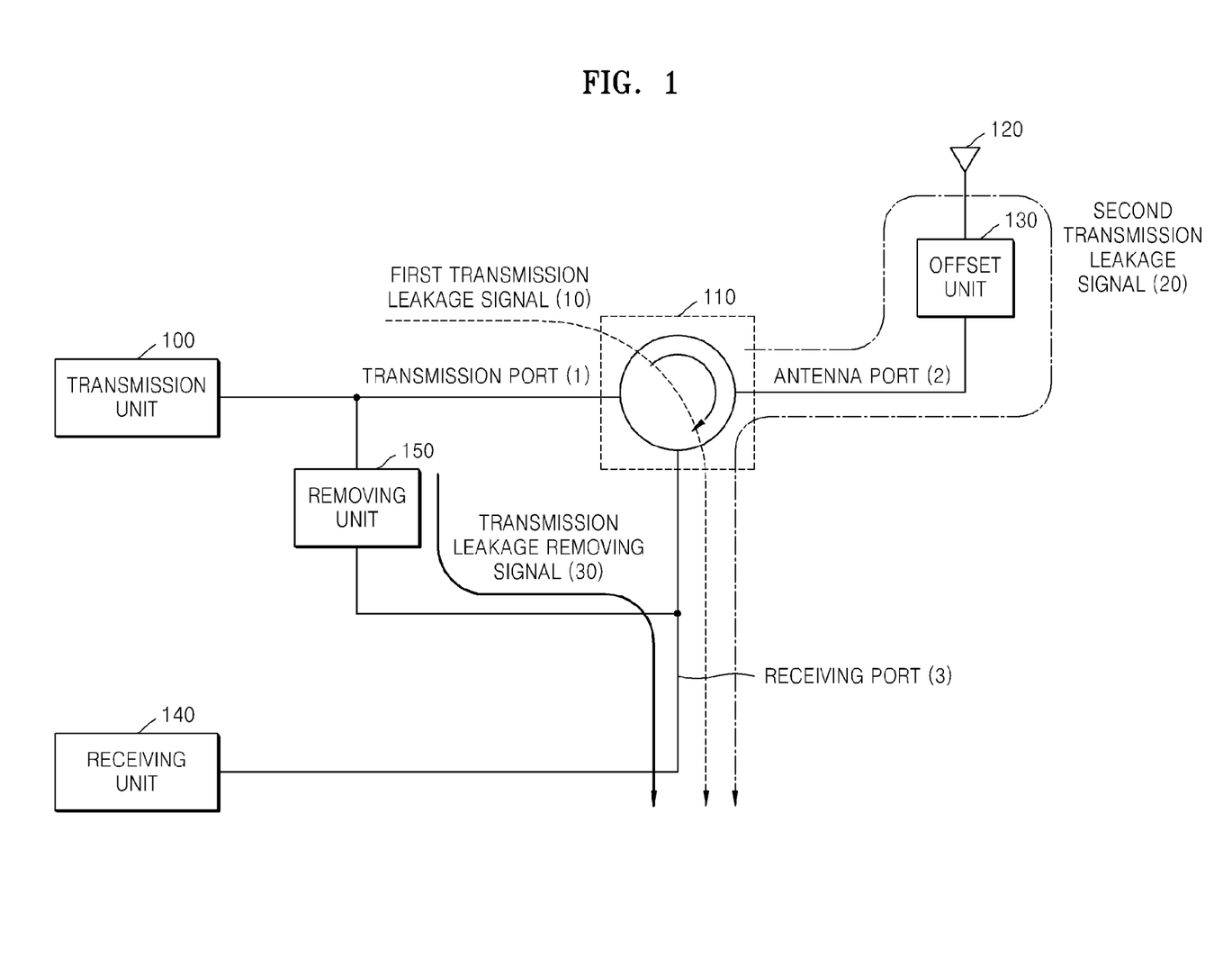
FIG. 1 illustrates a structure of an apparatus for removing a transmission leakage signal, according to an exemplary embodiment.

FIG. 1 illustrates a structure of an apparatus for removing a transmission leakage signal, according to an exemplary embodiment. Referring to FIG. 1, the apparatus for removing the transmission leakage signal according to the current exemplary embodiment includes a transmission unit 100, a circulator 110, an antenna 120, an offset unit 130, a receiving unit 140, and a removing unit 150. The circulator 110 includes three ports, i.e., a transmission port 1, an antenna port 2, and a receiving port 3.

A signal transmitted by the transmission unit 100 is input to the circulator 110 via the transmission port 1. At this time, if a leakage signal of the transmission signal (hereinafter, referred to as a first transmission leakage signal 10) is generated at the circulator 110, this first transmission leakage signal 10 is input to the receiving port 3. In addition, when the transmission signal is transmitted to the antenna 120 via the circulator 110, an output signal and a reflection signal of the antenna 120 (hereinafter, referred to as a second transmission leakage signal 20) are generated from the transmission signal, and the second transmission leakage signal 20 is input to the receiving port 3. The leakage signal that is input to the receiving port 3 may be the sum of the first transmission leakage signal 10 and the second transmission leakage signal 20.

Since one of or the sum of the magnitudes of the first transmission leakage signal 10 and the second transmission leakage signal 20 may be greater than a magnitude of a receiving signal received through the receiving port 3, it is difficult to design the apparatus for removing a transmission leakage signal and performance of the apparatus is degraded. To prevent these problems, the removing unit 150 is connected to the transmission port 1 and the receiving port 3, and generates a transmission leakage removing signal 30 that is a signal having a same magnitude as one of or the sum of the magnitudes of the first and second transmission leakage signals 10 and 20 and having an opposite phase to one of the phases or an aggregate phase of the first and second transmission leakage signals 10 and 20.

In order to vary the magnitude and the phase of the transmission leakage removing signal 30, the removing unit 150 is constituted by at least one of a resistor R, a capacitor C, and an inductor L. By varying the phase of the second transmission leakage signal 20 reflected by the antenna 120 using the offset unit 130, the apparatus for removing a transmission leakage signal according to the current exemplary embodiment may be further optimized.

The resistor R may include a lumped element such as a chip or a lead resistor, a distributed element that may be represented as a transmission line, or a variable resistor that is manually adjustable. The capacitor C may include a lumped element such as a chip, a distributed element such as a micro-strip line structure or a strip line structure, or a variable capacitor that is manually adjustable. The inductor L may also include a lumped element or a distributed element such as a micro-strip line structure or a strip line structure. The offset unit 130 may also include a lumped element or a distributed element such as a micro-strip line structure or a strip line structure.

The removing unit 150 may have a serial, parallel or serial/parallel combination structure, and its position may be changed, as illustrated in FIGS. 3A through 3G, and the removing unit 150 may be disposed at multiple stages. Since each of the resistor R, the capacitor C, and the inductor L generally used has a cut-off frequency in the range of several hundred MHz to several GHz, transmission leakage signals in all frequency bands in the range of 840 to 960 MHz (about 100 MHz), which are used in a radio frequency identification (RFID) system using a UHF band, may be removed.

Figure 2:
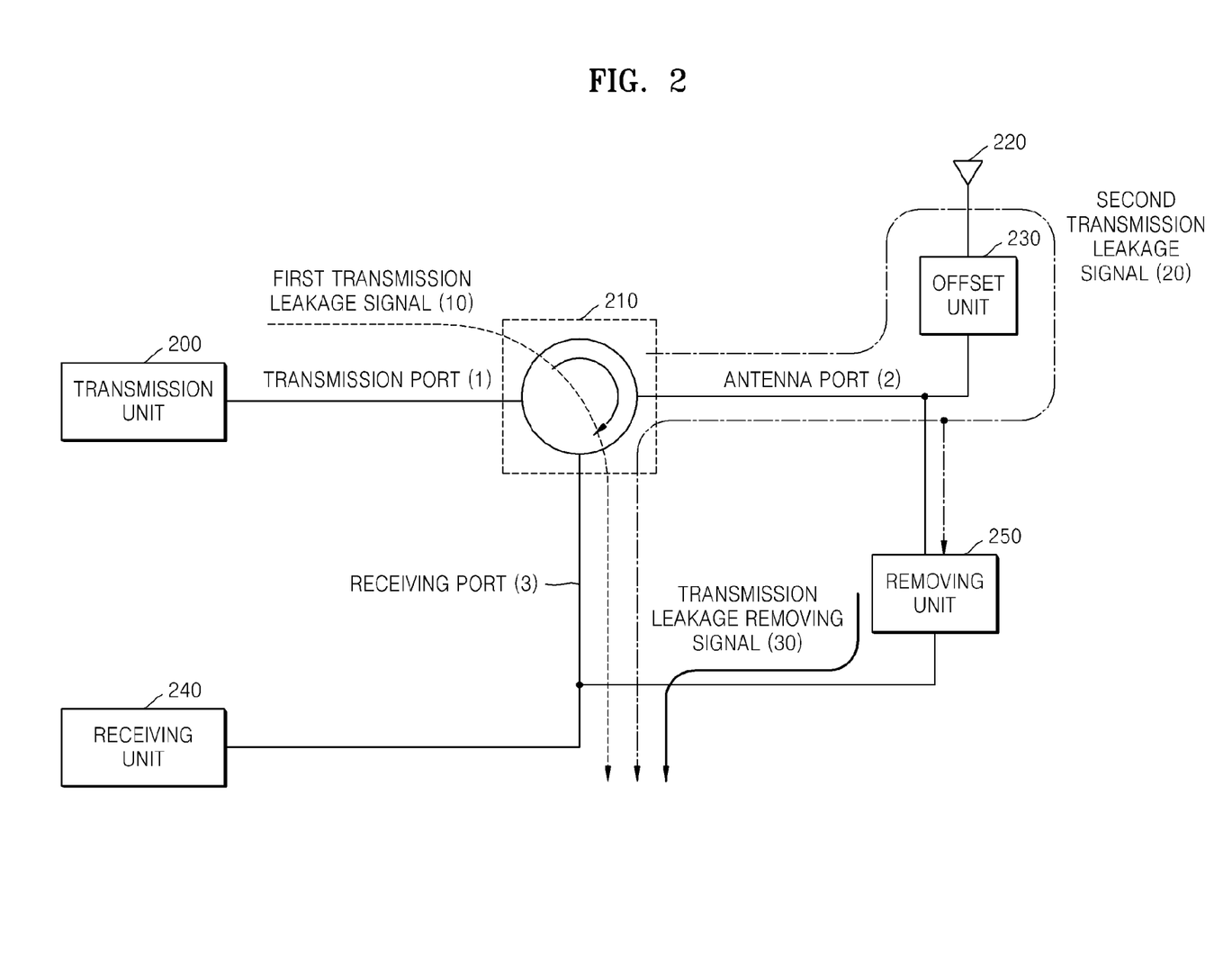
FIG. 2 illustrates a structure of an apparatus for removing a transmission leakage signal, according to another exemplary embodiment.
Figure 3A:
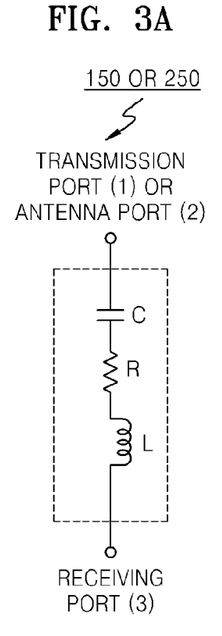
FIGS. 3A through 3G are detailed diagrams of a removing unit of the apparatuses of FIGS. 1 and 2, according to an exemplary embodiment.
Figure 3B:
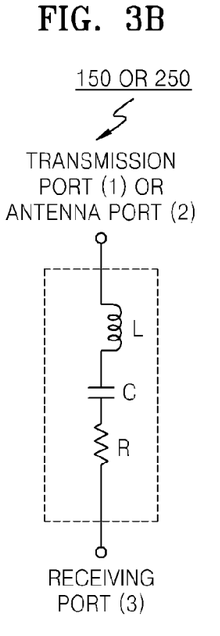
Figure 3C:
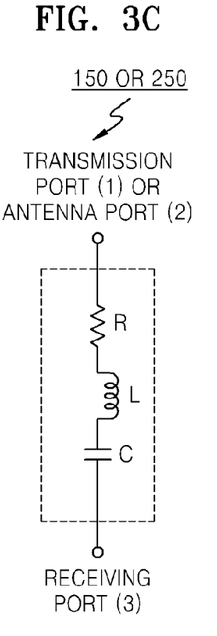
Figure 3D:
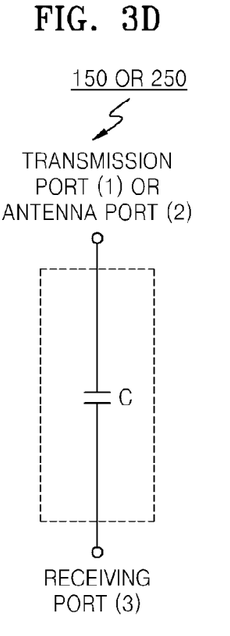
Figure 3E:
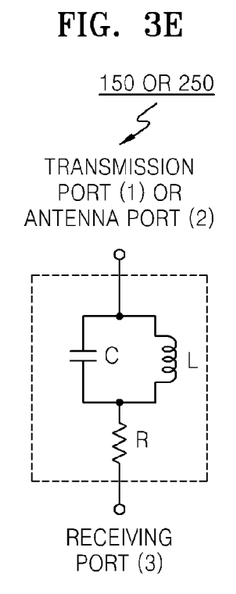
Figure 3F:
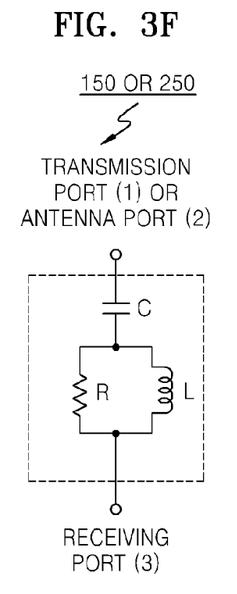
Figure 3G:
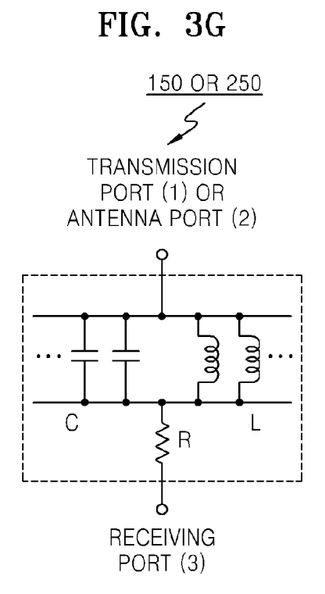

FIG. 2 illustrates a structure of an apparatus for removing a transmission leakage signal, according to another exemplary embodiment. The apparatus for removing the transmission leakage signal according to the current exemplary embodiment includes a transmission unit 200, a circulator 210, an antenna 220, an offset unit 230, a receiving unit 240, and a removing unit 250. The circulator 210 includes three ports, i.e., a transmission port 1, an antenna port 2, and a receiving port 3.

The exemplary embodiment of FIG. 2 is different from the exemplary embodiment of FIG. 1 in that the removing unit 250 is connected to the antenna port 2 and the receiving port 3, and generates a signal having a same magnitude as one of or the sum of the magnitudes of the first and second transmission leakage signals 10 and 20 and having an opposite phase to one of the phases or an aggregate phase of the first and second transmission leakage signals 10 and 20, i.e., a transmission leakage removing signal 30. Other elements of FIG. 2 are the same as those of FIG. 1 and thus, a description thereof will not be provided here.

Figure 4:
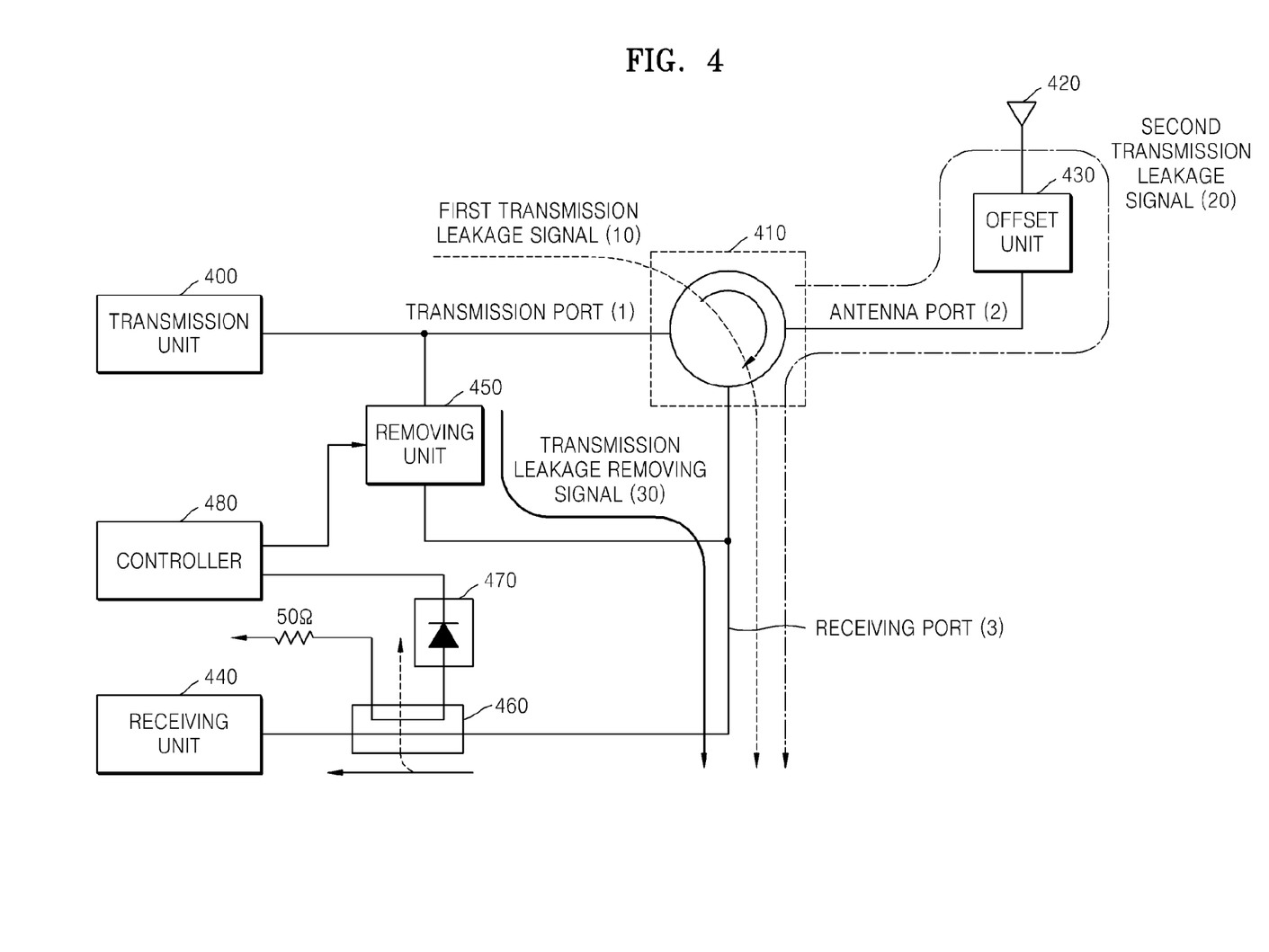
FIG. 4 illustrates a structure of an apparatus for removing a transmission leakage signal, according to another exemplary embodiment.

FIG. 4 illustrates a structure of an apparatus for removing a transmission leakage signal according to another exemplary embodiment. The apparatus for removing the transmission leakage signal, according to the current exemplary embodiment, includes a transmission unit 400, a circulator 410, an antenna 420, an offset unit 430, a receiving unit 440, a removing unit 450, a directional coupler 460, a leakage signal detector 470, and a controller 480. The circulator 410 includes three ports, i.e., a transmission port 1, an antenna port 2, and a receiving port 3.

A signal transmitted by the transmission unit 400 is input to the circulator 410 via the transmission port 1. At this time, if a leakage signal of the transmission signal, i.e., a first transmission leakage signal 10, is generated at the circulator 410, this first transmission leakage signal 10 is input to the receiving port 3. In addition, when the transmission signal is transmitted to the antenna 420 via the circulator 410, an output signal and a second transmission leakage signal 20 are generated from the transmission signal, and the second transmission leakage signal 20 is input to the receiving port 3. The leakage signal that is input to the receiving port 3 may be the sum of the first transmission leakage signal 10 and the second transmission leakage signal 20.

The first transmission leakage signal 10 and the second transmission leakage signal 20 that are input to the receiving port 3 are input to the receiving unit 440 and the leakage signal detector 470 via the directional coupler 460. The leakage signal detector 470 detects at least a portion of the first transmission leakage signal 10 and the second transmission leakage signal 20 that is input via the directional coupler 460. The leakage signal detector 470 converts the detected at least the portion of the first and second transmission leakage signals 10 and 20 into a leakage voltage signal, and outputs the leakage voltage signal to the controller 480. The leakage signal detector 470 may include an element such as a detection chip, a Schottky diode or a transistor.

Figure 5A:
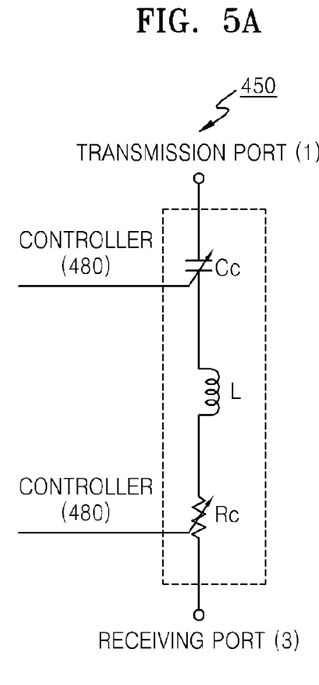
FIGS. 5A and 5B are detailed diagrams of a removing unit of the apparatus of FIG. 4, according to an exemplary embodiment.
Figure 5B:
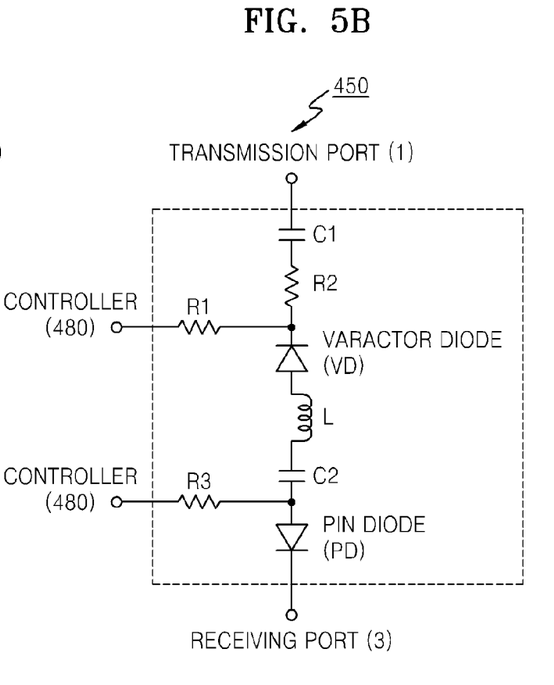

The controller 480 receives the leakage voltage signal output by the leakage signal detector 470, generates a control signal used to remove at least the portion of the first and second transmission leakage signals 10 and 20, and outputs the control signal to the removing unit 450. The removing unit 450 includes a variable capacitor Cc, an inductor L and a variable resistor Rc as shown in FIG. 5A. However, the removing unit 450 of FIG. 5A may be constituted by only a portion of the variable capacitor Cc, the inductor L and the variable resistor Rc as shown in FIG. 5A. Referring to FIG. 5B, the removing unit 450 includes resistors R1, R2, R3, an inductor L, capacitors C1, C2, a varactor diode (VD), and a PIN diode (PD). However, the removing unit 450 of FIG. 5B may be constituted by only a portion of the resistors R1, R2, R3, the inductor L, the capacitors C1, C2, the varactor diode (VD), and the PIN diode (PD). The control signal output from the controller 480 to control the removing unit 450 is input to the variable capacitor Cc and the variable resistor Rc to vary values of the variable capacitor Cc and the variable resistor Rc, as illustrated in FIG. 5A. However, the control signal of the controller 480 may be input to one of the variable capacitor Cc and the variable resistor Rc. Referring to FIG. 5B, the control signal is input to adjust an output signal of the VD and an output signal of the PD. However, the control signal may be input to adjust one of the output signal of the VD and the output signal of the PD. The controller 480 generates the control signal and outputs the control signal to the removing unit 450 until the leakage voltage signal output by the leakage signal detector 470 reaches a threshold value, e.g., a predetermined minimum value.

Since one of or the sum of the magnitudes of the first and second transmission leakage signals 10 and 20 input to the receiving port 3 may be greater than a magnitude of a receiving signal received through the receiving port 3, it is difficult to design the apparatus for removing a transmission leakage signal and performance of the apparatus is degraded. To prevent these problems, the removing unit 450 is disposed between the transmission port 1 and the receiving port 3 of the circulator 410.

The removing unit 450 generates a signal having a same magnitude as one of or the sum of the magnitudes of the leakage signals input to the receiving port 3, i.e., the first and second transmission leakage signals 10 and 20, and having an opposite phase to one of the phases or an aggregate phase of the first and second transmission leakage signals 10 and 20, i.e., a transmission leakage removing signal 30, and outputs the transmission leakage removing signal 30 to the receiving port 3, thereby removing at least a portion of the first and second transmission leakage signals 10 and 20. In this regard, the removing unit 450 adjusts an output of the transmission leakage removing signal 30 according to the control signal input from the controller 480.

FIGS. 5A and 5B are detailed diagrams of the removing unit 450. In order to vary the magnitude and the phase of the transmission leakage removing signal 30, the removing unit 450 may use at least one of the variable capacitor Cc, the inductor L, and the variable resistor Rc or at least one of the inductor L, the varactor diode (VD), and the PIN diode (PD), unlike in FIGS. 1 and 2. By varying the phase of the second transmission leakage signal 20 reflected by the offset unit 430, the apparatus for removing a transmission leakage signal according to the current exemplary embodiment may be further optimized. The inductor L of FIG. 5B may include a lumped element or a distributed element such as a micro-strip line structure or a strip line structure. The VD functions as the capacitor C of the previous exemplary embodiments, and an output of the VD may be electrically varied by using an analog signal or a digital signal. The output of the VD is varied according to the control signal output by the controller 480. The PD functions as the resistor R of the previous exemplary embodiments, and an output of the PD may be electrically varied by using an analog signal or a digital signal. The output of the PD is varied according to the control signal output by the controller 480.

FIG. 5B illustrates an example in which the inductor L, the VD, and the PD of the removing unit 450 are connected in series. In this manner, the inductor L, the VD, and the PD of the removing unit 450 may have a serial, parallel or serial/parallel combination structure, and positions thereof may be changed, and the inductor L, the VD, and the PD of the removing unit 450 may be disposed at multiple stages.

The removing unit 450 generates the transmission leakage removing signal 30 by receiving the control signal from the controller 480, and then, outputs the transmission leakage removing signal 30 to the receiving port 3, thereby removing at least a portion of the first and second transmission leakage signals 10 and 20.

Alternatively, the controller 480 may further include a memory (not shown) which stores values corresponding to different leakage voltage signals generated at the leakage signal detector 470. Thus, if the controller 480 receives a certain leakage voltage signal output by the leakage signal detector 470, the controller 480 outputs a control signal based on a value stored in the memory and corresponding to the certain leakage voltage signal. At this time, if the controller 480 determines that the certain leakage voltage signal output by the leakage signal detector 470 reaches a new value which is less than an existing threshold value, e.g., a predetermined minimum value, based on the values stored in the memory, the controller 480 records the new value in the memory as a new threshold value which will be compared to a leakage control signal output from the leakage signal detector 470 thereafter. If, however, the certain leakage voltage signal does not reach the existing threshold value, the controller 480 may continue generating the control signal corresponding to the certain leakage voltage signal until the certain leakage voltage signal reaches the existing threshold value.

Figure 6:
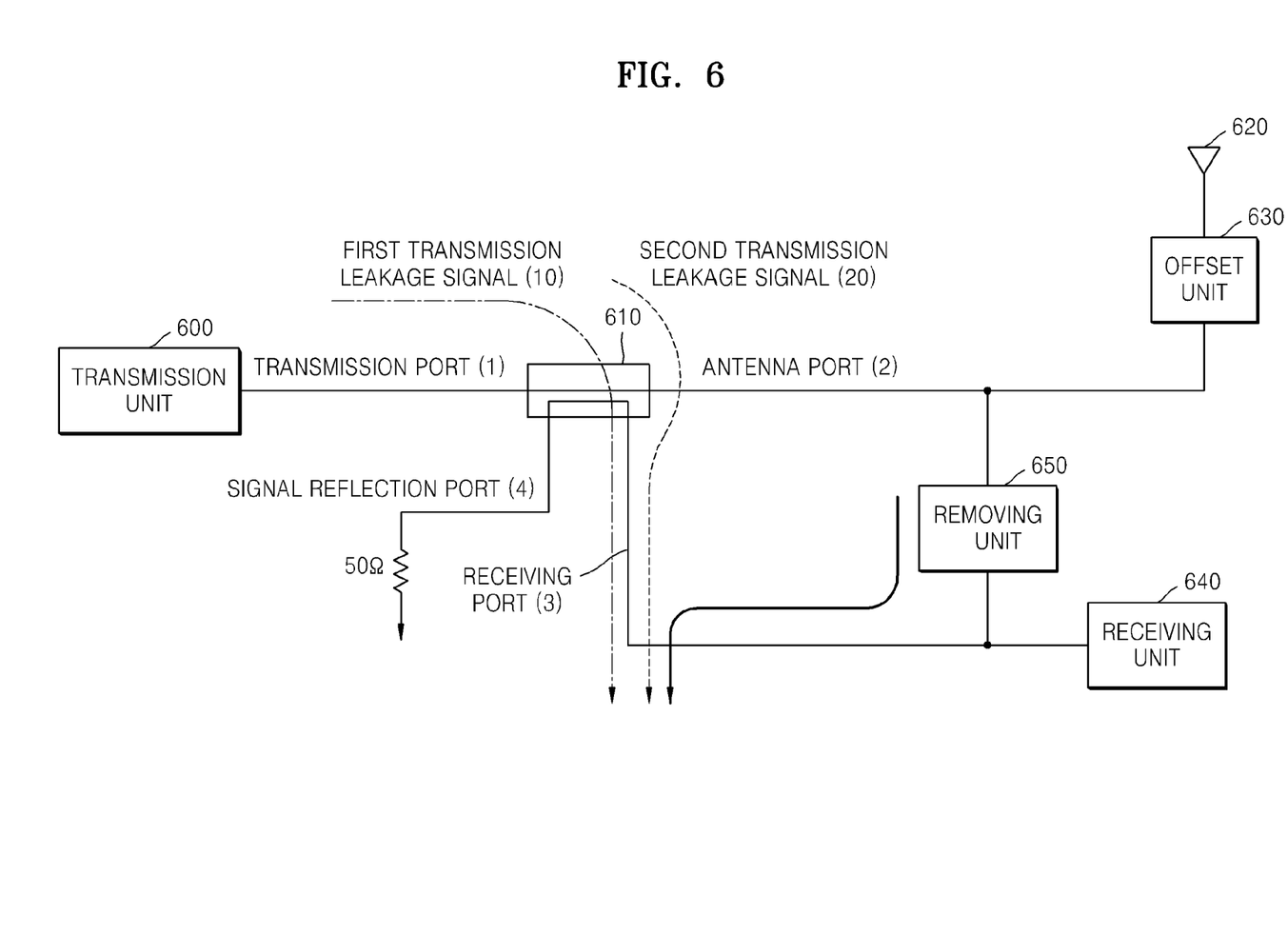
FIG. 6 illustrates a structure of an apparatus for removing a transmission leakage signal, according to another exemplary embodiment.

FIG. 6 illustrates a structure of an apparatus for removing a transmission leakage signal according to another exemplary embodiment. Referring to FIG. 6, the apparatus for removing the transmission leakage signal according to the current exemplary embodiment includes a transmission unit 600, a directional coupler 610, an antenna 620, an offset unit 630, a receiving unit 640, and a removing unit 650. The directional coupler 610 includes four ports, i.e., a transmission port 1, an antenna port 2, a receiving port 3, and a signal reflection port 4.

A signal transmitted by the transmission unit 600 is input to the directional coupler 610 via the transmission port 1. At this time, if a leakage signal of the transmission signal, i.e., a first transmission leakage signal 10, is generated at the directional coupler 610, this first transmission leakage signal 10 is input to the receiving port 3. In addition, when the transmission signal is transmitted to the antenna 620 via the directional coupler 610, an output signal and a reflection signal of the antenna 620 are generated from the transmission signal, and the second transmission leakage signal 20 is input to the receiving port 3. The leakage signal that is input to the receiving port 3 may be the sum of the first transmission leakage signal 10 and the second transmission leakage signal 20.

Since one of or the sum of the magnitudes of the first and second transmission leakage signals 10 and 20 input to the receiving port 3 may be greater than a magnitude of a receiving signal received through the receiving port 3, it is difficult to design the apparatus for removing a transmission leakage signal and performance of the apparatus is degraded. To prevent these problems, the removing unit 650 is connected to the antenna port 2 and the receiving port 3 of the directional coupler 610. The removing unit 650 generates a signal having a same magnitude as one of or the sum of the magnitudes of the first and second transmission leakage signals 10 and 20, and having an opposite phase to one of the phases or an aggregate phase of the first and second transmission leakage signals 10 and 20, i.e., a transmission leakage removing signal 30.

In order to vary the magnitude and the phase of the transmission leakage removing signal 30, the removing unit 650 may use at least one of a combination of the resistor R, the capacitor C, and the inductor L, as illustrated in FIGS. 3A through 3G. By varying the phase of the second transmission leakage signal 20 reflected by the antenna 620 using the offset unit 630, the apparatus for removing a transmission leakage signal according to the current exemplary embodiment may be further optimized.

The resistor R may include a lumped element such as a chip or a lead resistor, a distributed element that may be represented as a transmission line, or a variable resistor that is manually adjustable. The capacitor C may include a lumped element such as a chip, a distributed element such as a micro-strip line structure or strip line structure, or a variable capacitor that is manually adjustable. The inductor L may also include a lumped element or a distributed element such as a micro-strip line structure or a strip line structure. The offset unit 630 may also include a lumped element or a distributed element such as a micro-strip line structure or a strip line structure.

The removing unit 650 may have a serial, parallel or serial/parallel combination structure, and its position may be changed, as illustrated in FIGS. 3A through 3G, and the removing unit 650 may be disposed at multiple stages. Since each of the resistor R, the capacitor C, and the inductor L generally used has a cut-off frequency in the range of several hundred MHz to several GHz, transmission leakage signals in all frequency bands in the range of 840 to 960 MHz (about 100 MHz), which are used in an RFID system using a UHF band, may be removed.

Figure 7:
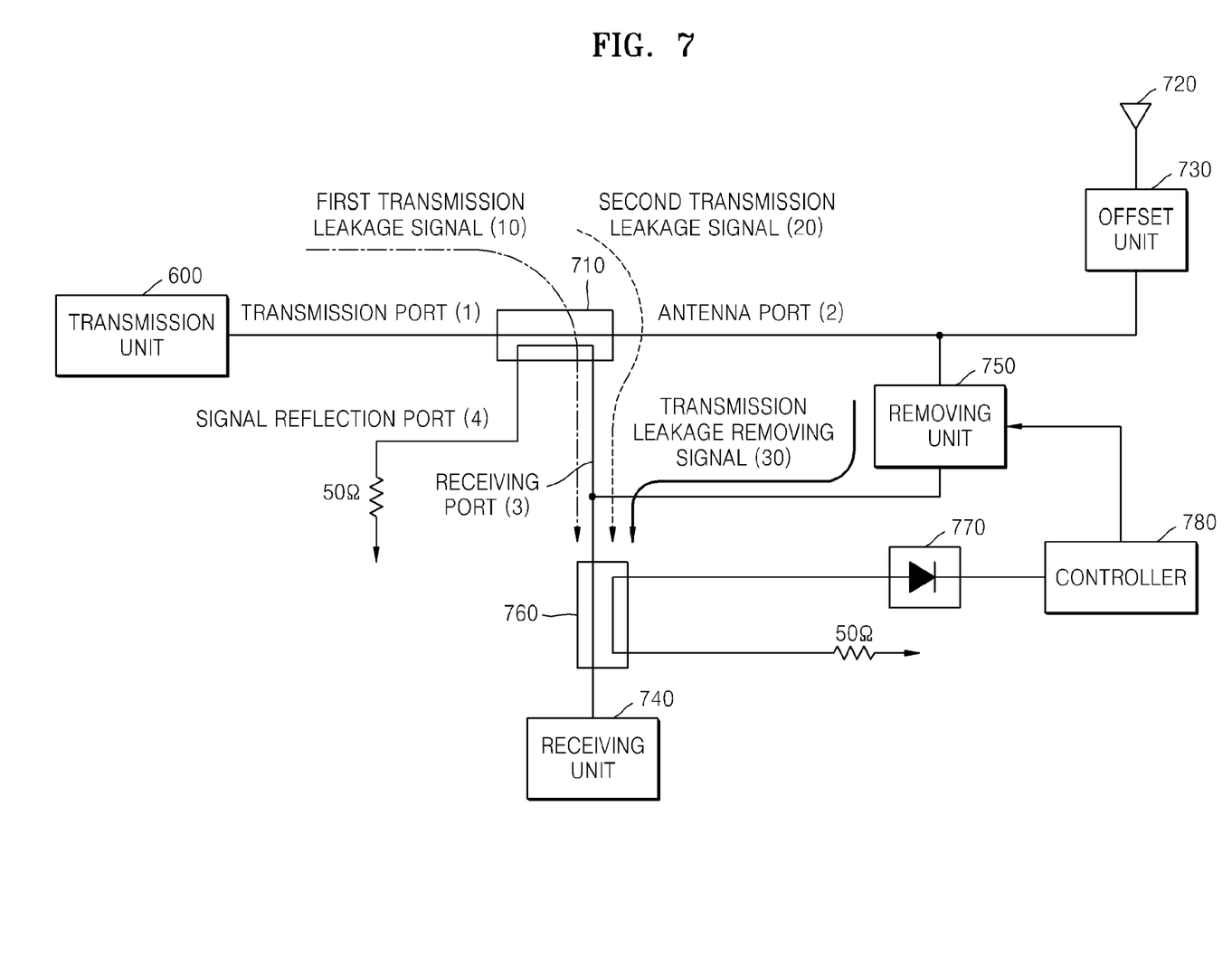
FIG. 7 illustrates a structure of an apparatus for removing a transmission leakage signal, according to another exemplary embodiment.

FIG. 7 illustrates a structure of an apparatus for removing a transmission leakage signal, according to another exemplary embodiment. Referring to FIG. 7, the apparatus for removing the transmission leakage signal according to the current exemplary embodiment includes a transmission unit 700, a first directional coupler 710, an antenna 720, an offset unit 730, a receiving unit 740, a removing unit 750, a second directional coupler 760, a leakage signal detector 770, and a controller 780. The first directional coupler 710 includes four ports, i.e., a transmission port 1, an antenna port 2, a receiving port 3, and a signal reflection port 4.

A signal transmitted by the transmission unit 700 is input to the first directional coupler 710 via the transmission port 1. At this time, if a leakage signal of the transmission signal, i.e., a first transmission leakage signal 10, is generated at the first directional coupler 710, the first transmission leakage signal 10 is input to the receiving port 3. In addition, when the transmission signal is transmitted to the antenna 720 via the first directional coupler 710, an output signal and a second transmission leakage signal 20 is generated from the transmission signal, and the second transmission leakage signal 20 is input to the receiving port 3. The leakage signal that is input to the receiving port 3 may be the sum of the first transmission leakage signal 10 and the second transmission leakage signal 20.

The first transmission leakage signal 10 and the second transmission leakage signal 20 that are input to the receiving port 3 are input to the receiving unit 740 and the leakage signal detector 770 via the second directional coupler 760. The leakage signal detector 770 detects at least a portion of the first transmission leakage signal 10 and the second transmission leakage signal 20 that is input via the second directional coupler 760. The leakage signal detector 770 converts the detected at least the portion of the first and second transmission leakage signals 10 and 20 into a single leakage voltage signal or corresponding leakage voltage signals, and outputs the leakage voltage signal to the controller 780.

The controller 780 receives the leakage voltage signal output by the leakage signal detector 770, generates a control signal used to remove the leakage voltage signal, and outputs the control signal to the removing unit 750. The removing unit 750 may be the same as or similar to the removing unit 450 as illustrated in FIG. 4. The control signal output from the controller 780 to control the removing unit 750 is input to the variable capacitor Cc and the variable resistor Rc to vary values of the variable capacitor Cc and the variable resistor Rc, as illustrated in FIG. 5A. However, the control signal of the controller 480 may be input to one of the variable capacitor Cc and the variable resistor Rc. Referring to FIG. 5B, the control signal is input to adjust an output signal of the VD and an output signal of the PD. However, the control signal may be input to adjust one of the output signal of the VD and the output signal of the PD. The controller 780 generates the control signal and outputs the control signal to the removing unit 750 until the leakage voltage signal output by the leakage signal detector 770 reaches a threshold value, e.g., a predetermined minimum value.

Since one of or the sum of the magnitudes of the first and second transmission leakage signals 10 and 20 input to the receiving port 3 may be greater than a magnitude of a receiving signal received through the receiving port 3, it is difficult to design the apparatus for removing a transmission leakage signal and performance of the apparatus is degraded. To prevent these problems, the removing unit 750 is disposed between the antenna port 2 and the receiving port 3 of the first directional coupler 710.

The removing unit 750 generates a reflection signal input to the receiving port 3, i.e. a signal having a same magnitude as one of or the sum of the magnitudes of the first and second transmission leakage signals 10 and 20 and having an opposite phase to one of the phases or an aggregate phase of the first and second transmission leakage signals 10 and 20, i.e., a transmission leakage removing signal 30, and outputs the transmission leakage removing signal 30 to the receiving port 3, thereby removing at least the portion of the first and second transmission leakage signals 10 and 20. In this regard, the controller 750 adjusts an output of the transmission leakage removing signal 30 according to the control signal input from the controller 780. FIGS. 5A and 5B are detailed diagrams of the removing unit 750, and the removing unit 750 has been described as above and thus, a description thereof will not be provided here. The removing unit 750 generates the transmission leakage removing signal 30 by receiving the control signal from the controller 780 and then outputs the transmission leakage removing signal 30 to the receiving port 3, thereby removing at least the portion of the first and second transmission leakage signals 10 and 20.

Alternatively, the controller 780 may further include a memory (not shown) which stores values corresponding to different leakage voltage signals generated at the leakage signal detector 770. Thus, if the controller 780 receives a certain leakage voltage signal output by the leakage signal detector 770, the controller 780 outputs a control signal based on a value stored in the memory and corresponding to the certain leakage voltage signal. At this time, if the controller 780 determines that the certain leakage voltage signal output by the leakage signal detector 770 reaches a new value which is less than an existing threshold value, e.g., a predetermined minimum value, based on the values stored in the memory, the controller 780 records the new value in the memory as a new threshold value which will be compared to a leakage control signal output from the leakage signal detector 770 thereafter. If, however, the certain leakage voltage signal does not reach the existing threshold value, the controller 780 may continue generating the control signal corresponding to the certain leakage voltage signal until the certain leakage voltage signal reaches the existing threshold value.

As described above, in the apparatus for removing a transmission leakage signal according to the present inventive concept, a transmission leakage signal can be removed easily from all frequency bands of an RFID system. Also, a recognition rate of a tag can be increased in a real-time adaption manner so as to remove the transmission leakage signal even when the RFID system environment is changed.

While the present inventive concept has been particularly shown and described with reference to the exemplary embodiments thereof, it will be understood by those of ordinary skill in the art that various changes in form and details may be made therein without departing from the spirit and scope of the present inventive concept as defined by the following claims.

What is claimed is:

1. An apparatus for removing a leakage signal, the apparatus comprising:
    a coupler comprising:
    a transmission port through which a transmission signal is input;
    an antenna port through which the transmission signal is output to an antenna and a receiving signal is input from the antenna; and
    a receiving port through which the receiving signal is output;
    a removing unit which is connected to the receiving port and outputs, to the receiving port, a leakage removing signal having a same magnitude as one of or a sum of a magnitude of a first leakage signal of the transmission signal, which is generated at the transmission port and input to the receiving port, and a magnitude of a second leakage signal of the transmission signal which is input to the receiving port through the antenna port, the leakage removing signal having an opposite phase to one of the phases or an aggregate phase of the first and second leakage signals;
    a leakage signal detector which detects at least a portion of the first leakage signal and the second leakage signal; and
    a controller which outputs a control signal corresponding to the detected at least the portion of the first and second leakage signals,
    wherein the removing unit receives the control signal to output the leakage removing signal, and
    wherein the removing unit comprises at least a portion of a first diode and a second diode that adjust an output value of the leakage removing signal by using the control signal.

2. The apparatus of claim 1, wherein the removing unit is further connected to at least one of the transmission port and the antennal port.

3. The apparatus of claim 1, further comprising an offset unit which changes the phase of the second leakage signal.

4. The apparatus of claim 1, wherein the first leakage signal comprises a signal generated at the transmission port when the transmission signal is transmitted from the transmission port to the antenna port through the coupler, and
    wherein the second leakage signal comprises a reflection signal which, as a portion of the transmission signal input from the transmission port to the antenna port through the coupler, is reflected from the antenna.

5. The apparatus of claim 4, further comprising an offset unit which changes the phase of the second leakage signal.

6. The apparatus of claim 1, wherein the removing unit comprises at least one of a resistor, an inductor, and a capacitor each comprising a lumped element or a distributed element,
    wherein the resistor, the inductor, and the capacitor have a serial, parallel or a serial/parallel combination structure, and
    wherein positions of the resistor, the inductor, and the capacitor are variable, and the resistor, the inductor, and the capacitor are disposed at multiple stages.

7. The apparatus of claim 3, wherein the offset unit comprises a lumped element or a distributed element.

8. The apparatus of claim 1, wherein the removing unit further comprises an inductor.

9. The apparatus of claim 8, wherein the inductor, the first diode and the second diode are connected in series, and positions of the inductor, the first diode and the second diode are variable, and the inductor, the first diode and the second diode are disposed at multiple stages.

10. The apparatus of claim 1, wherein the controller outputs the control signal to the removing unit until the detected at least the portion of the first and second transmission leakage signals reaches a threshold value.

11. The apparatus of claim 1, wherein the coupler comprises at least one of a circulator and a directional coupler.

12. The apparatus of claim 1, wherein the leakage signal detector outputs a certain signal corresponding to the detected at least the portion of the first and second leakage signals, and
    wherein the controller stores values corresponding to different signals generated at the leakage signal detector including the certain signal, and the control signal is output from the controller based on a value, among the values, corresponding to the certain signal.

13. The apparatus of claim 12, wherein if it is determined based on the values stored in the controller that the certain signal reaches a value which is less than an existing threshold value, the controller records the certain value as a new threshold value which is compared to another signal output from the leakage signal detector.

14. The apparatus of claim 13, wherein if it is determined based on the values stored in the controller that the certain signal does not reach the existing threshold value, the controller continues generating the control signal corresponding to the certain signal until the certain signal reaches the existing threshold value.

15. An apparatus for removing a leakage signal, the apparatus comprising:
- a coupler comprising:
  - a transmission port through which a transmission signal is input;
  - an antenna port through which the transmission signal is output to an antenna and a receiving signal is input from the antenna; and
  - a receiving port through which the receiving signal is output;
- a removing unit which is connected to the receiving port and outputs, to the receiving port, a leakage removing signal having a same magnitude as one of or a sum of a magnitude of a first leakage signal of the transmission signal, which is generated at the transmission port and input to the receiving port, and a magnitude of a second leakage signal of the transmission signal which is input to the receiving port through the antenna port, the leakage removing signal having an opposite phase to one of the phases or an aggregate phase of the first and second leakage signals;
- a leakage signal detector which detects at least a portion of the first leakage signal and the second leakage signal;
- a controller which outputs a control signal corresponding to the detected at least the portion of the first and second leakage signals; and
- another coupler which transmits the first transmission leakage signal, the second transmission leakage signal, and the removing signal to a receiving unit and the leakage signal detector via the receiving port,
- wherein the removing unit receives the control signal to output the leakage removing signal.

* * * * *